UNITED STATES PATENT OFFICE.

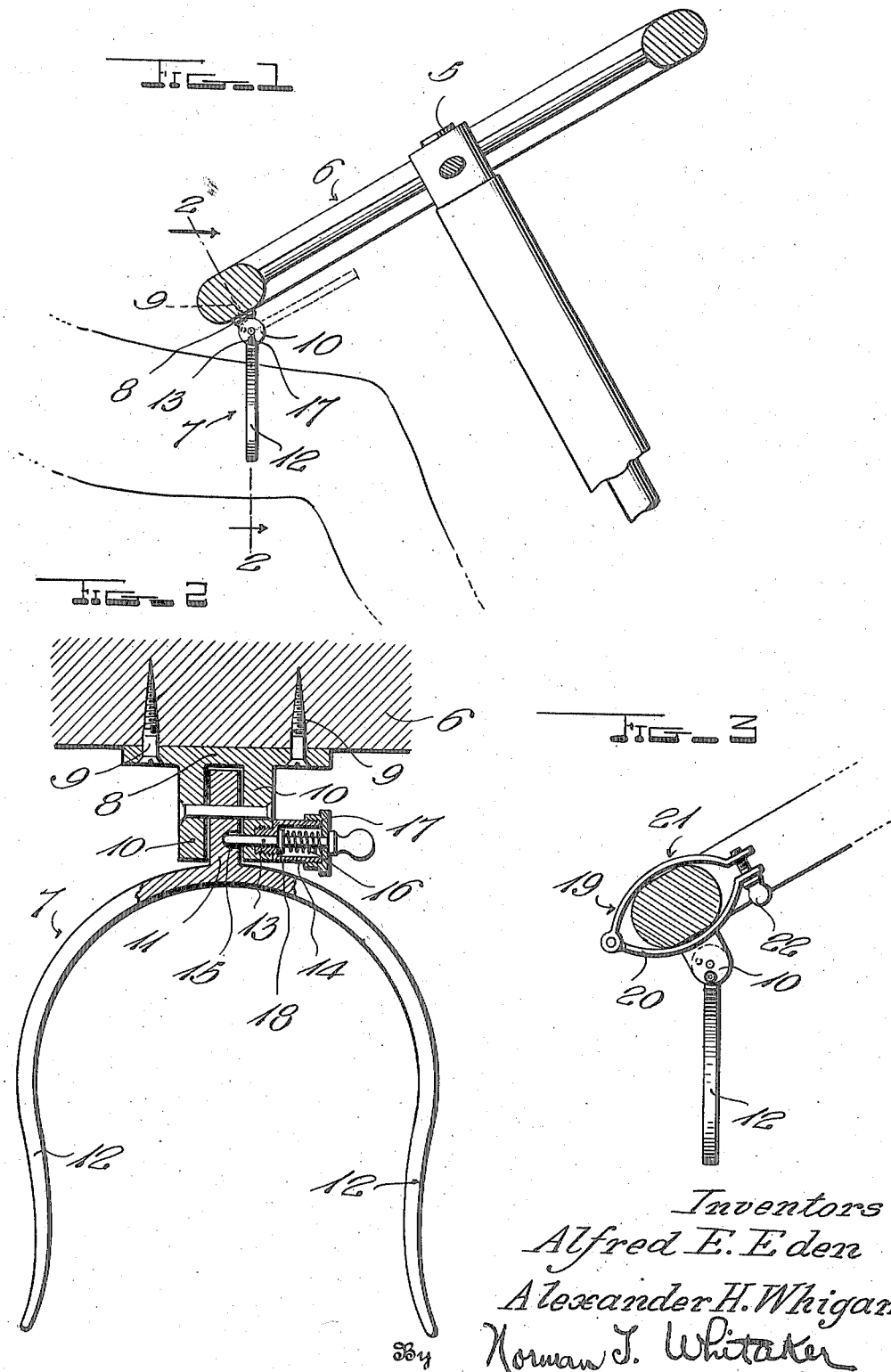

ALEXANDER H. WHIGAM, OF PEORIA, AND ALFRED E. EDEN, OF SULLIVAN, ILLINOIS, ASSIGNORS OF ONE-THIRD TO PERRY BLAND, OF SULLIVAN, ILLINOIS.

STEERING-WHEEL ATTACHMENT.

1,314,995.  Specification of Letters Patent.  Patented Sept. 2, 1919.

Application filed September 12, 1918. Serial No. 253,739.

*To all whom it may concern:*

Be it known that we, ALEXANDER H. WHIGAM, a citizen of the United States, and a resident of Peoria, in the county of Peoria and State of Illinois, and ALFRED E. EDEN, a citizen of the United States, and a resident of Sullivan, in the county of Moultrie and State of Illinois, have invented new and useful Improvements in Steering-Wheel Attachments, of which the following is a specification.

This invention relates to steering wheel attachments and has particular reference to attachments designed to be used especially in connection with automobile steering wheels although not restricted to such use.

An important object of the invention is to provide in an attachment of the above named class a means whereby various elements thereof may be locked in a desired position with respect to each other when the device is made to assume either an operative or inoperative position.

A further object of the invention is to provide a device of the above mentioned character which may be readily attached to the steering wheel without altering, changing or disfiguring any part thereof.

A further object of the invention is to provide a device of the above mentioned character which is strong, durable, reliable in operation and inexpensive to manufacture.

Other objects and advantages of the invention will be apparent during the course of the following description taken in connection with the accompanying drawings.

In the drawings, forming a part of this specification and in which like numerals are employed to designate like parts throughout the same, Figure 1 is a sectional view of a steering wheel having the device embodying the preferred form of our invention attached thereto, the device embodying our invention being shown in elevation, Fig. 2 is a sectional view taken on line 2—2 of Fig. 1, and, Fig. 3 is an elevation of the device embodying the modified form of our invention.

In the drawings, attention being called to Figs. 1 and 2 wherein is shown a preferred form of our invention, the numeral 5 indicates a steering post to which is secured the conventional type of steering wheel 6 having the device embodying our invention attached thereto, which device is indicated as a whole by the numeral 7 and comprises a plate 8 secured to the wheel 6 by means of screws 9. The plate 8 is provided with a pair of ears 10 between which is pivoted an arm 11, which arm terminates in a pair of diverging fingers 12, the fingers being curved to substantially conform to the contour of the driver's limb as shown in Fig. 1 when the device is being used to facilitate the steering of an automobile or other vehicle. In order to lock the fingers 12 in the position shown in Fig. 1 there is provided a pin 13 journaled within a casing 14 the end of which pin is adapted to enter a recess 15 formed within the arm 11. As a means for retaining the pin 13 normally in the position shown in Fig. 2 there is provided a spring 16 encircling the pin 13 and disposed between the screw-threaded cap 17 of the casing 14 and the shoulder 18 carried by the pin 13. When it is not desired to use the device the same may be folded to the dotted line position shown in Fig. 1 and locked in such position by means of the pin 13 coöperating with the various other elements associated therewith.

In considering Fig. 3, wherein is shown a modified form of our invention, it will be noted that the only substantial alteration in the construction of the device resides in the means for securing the device to the steering wheel. In the modified form of our invention instead of employing screws as shown in Fig. 2 as a means for securing the device to the steering wheel we prefer to employ a clamp indicated as a whole by the numeral 19, which clamp comprises an arcuate shaped member 20 to which is secured the ears 10 and the other coöperating elements shown in Fig. 2 and hereinbefore described. To the arcuate shaped member 20 there is pivotally connected a yoke 21, the yoke and arcuate shaped member being connected by means of a thumb screw 22. By this arrangement it is obvious that the device as a whole may be readily attached to or detached from a steering wheel.

From the drawings it is apparent that the device when used as diagrammatically indicated in Fig. 1 will greatly relieve the driver of the automobile or other vehicle when his arms become tired or cramped as is generally experienced after long continued driving.

It is to be understood that various changes in the shape, size and arrangement of parts may be resorted to without departing from the spirit of our invention or the scope of the subjoined claims.

Having thus described our invention, what we claim as new and desire to secure and protect by Letters Patent of the United States, is:

1. A steering wheel attachment comprising a pair of fingers pivotally connected to the steering wheel, and means for locking said fingers in a given position with respect to the steering wheel.

2. A steering wheel attachment comprising a pair of ears, a pair of fingers having pivotal connection with said ears, and means for locking said fingers in a given position with respect to the steering wheel.

3. A steering wheel attachment comprising a pair of ears, a pair of fingers terminating in an arm, said arm being pivotally connected to said fingers, and spring tension actuated means for retaining said fingers in a given position with respect to the steering wheel.

4. The combination with a steering wheel, of a pair of diverging fingers pivotally connected therewith, and means for normally retaining said fingers in a given position with respect to said wheel.

5. The combination with a steering wheel, of a pair of fingers pivotally connected thereto, and spring tension actuated means for normally retaining said fingers in a given position with respect to said wheel.

6. The combination with a steering wheel, of a pair of fingers detachably secured to said wheel, said fingers being free to move with respect to said wheel, and means for normally retaining said fingers in a given position with respect to said wheel.

7. An automobile steering wheel attachment comprising a pair of diverging fingers adapted to be secured to the steering wheel, said fingers depending downwardly and adapted to partially encircle the limb of the driver whereby the automobile may be steered by movement of the driver's limb.

8. An automobile steering wheel attachment comprising a depending element adapted to be secured to the steering wheel, said element depending a sufficient distance below the wheel to engage the limb of the automobile operator whereby the automobile may be steered in a desired course by movements of the operator's limb.

9. The combination with an automobile steering wheel, of a movable normally depending element pivotally secured to the wheel, said element depending a sufficient distance below the wheel to engage the limb of the automobile operator, and means for locking the movable element in a given position.

ALEXANDER H. WHIGAM.
ALFRED E. EDEN.